US012646871B2

(12) United States Patent
Phatiwuttipat

(10) Patent No.: US 12,646,871 B2
(45) Date of Patent: Jun. 2, 2026

(54) CONNECTION STRUCTURE FOR CONNECTING FLAT CABLE AND TERMINAL FITTING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Pipatthana Phatiwuttipat, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 280 days.

(21) Appl. No.: 18/289,502

(22) PCT Filed: Mar. 23, 2022

(86) PCT No.: PCT/JP2022/013347
§ 371 (c)(1),
(2) Date: Nov. 3, 2023

(87) PCT Pub. No.: WO2022/239489
PCT Pub. Date: Nov. 17, 2022

(65) Prior Publication Data
US 2024/0243497 A1 Jul. 18, 2024

(30) Foreign Application Priority Data
May 14, 2021 (JP) ................................ 2021-082090

(51) Int. Cl.
*H01R 12/61* (2011.01)
*H01R 12/65* (2011.01)

(52) U.S. Cl.
CPC ............. *H01R 12/61* (2013.01); *H01R 12/65* (2013.01)

(58) Field of Classification Search
CPC .......... H01R 12/61; H01R 12/65; H01R 4/02; H01R 4/023
See application file for complete search history.

(56) References Cited

U.S. PATENT DOCUMENTS 5,443,592 A * 8/1995 Ittah .................... H01R 13/113 439/852
5,577,928 A * 11/1996 Duclos .................. H01R 13/28 439/293
(Continued)

FOREIGN PATENT DOCUMENTS

JP 2002025653 A * 1/2002
JP 2002-270979 A 9/2002
(Continued)

OTHER PUBLICATIONS

English translation of JP2002025653 (Year: 2025).*
(Continued)

*Primary Examiner* — Tulsidas C Patel
*Assistant Examiner* — Carlos E Lopez-Pagan
(74) *Attorney, Agent, or Firm* — Venjuris, P.C.

(57) ABSTRACT

It is aimed to provide a connection structure for connecting a flat cable and a terminal fitting, the connection structure suppressing a reduction in connection reliability. A terminal fitting (10) is connected to a flat cable (60). The flat cable (60) includes a first connecting portion (64) located in a front end part of the flat cable (60) and a second connecting portion (65) located rearward of the first connecting portion
(Continued)

(64). The terminal fitting (10) includes a first welded portion (17) to be welded to the first connecting portion (64) and a second connecting portion (18) located rearward of the first welded portion (17) and to be welded to the second connecting portion (65).

5 Claims, 4 Drawing Sheets

(56) References Cited

U.S. PATENT DOCUMENTS

| | | | | |
|---|---|---|---|---|
| 6,283,802 | B1 * | 9/2001 | Sato | H01R 13/114 439/843 |
| 6,910,925 | B2 * | 6/2005 | Endo | H01R 13/187 439/856 |

FOREIGN PATENT DOCUMENTS

| | | | | |
|---|---|---|---|---|
| JP | 2003-157919 | A | | 5/2003 |
| JP | 2009-076224 | A | | 4/2009 |
| JP | 2011-113676 | A | | 6/2011 |
| JP | 2016225193 | A | * | 12/2016 |
| JP | 2017-204379 | A | | 11/2017 |

OTHER PUBLICATIONS

English translation of JP2016225193 (Year: 2025).*
International Search Report issued on May 24, 2022 for WO 2022/239489 A1 (4 pages).

* cited by examiner

CONNECTION STRUCTURE FOR CONNECTING FLAT CABLE AND TERMINAL FITTING

CROSS REFERENCE TO RELATED APPLICATIONS

This application is a national phase of PCT application No. PCT/JP2022/013347, filed on 23 Mar. 2022, which claims priority from Japanese patent application No. 2021-082090, filed on 14 May 2021, all of which are incorporated herein by reference.

TECHNICAL FIELD

The present disclosure relates to a connection structure for connecting a flat cable and a terminal fitting.

BACKGROUND

Patent Document 1 discloses a connection structure for connecting a flat cable and a terminal fitting. The terminal fitting includes a flat plate-like conductor path connecting portion. The conductor path connecting portion is connected to a front end part of the flat cable by soldering.

PRIOR ART DOCUMENT

Patent Document

Patent Document 1: JP 2017-204379 A

SUMMARY OF THE INVENTION

Problems to be Solved

When the flat cable is pulled rearward, stress is generated in a connected part of the terminal fitting and the flat cable. If this stress is large, the connected part may be damaged.

Accordingly, the present disclosure aims to provide a connection structure for connecting a flat cable and a terminal fitting, the connection structure being capable of suppressing a reduction in connection reliability.

Means to Solve the Problem

The present disclosure is directed to a connection structure for connecting a flat cable and a terminal fitting, the connection structure being provided with a flat cable and a terminal fitting to be connected to the flat cable, the flat cable including a first connecting portion located in a front end part of the flat cable and a second connecting portion located rearward of the first connecting portion, and the terminal fitting including a first welded portion to be welded to the first connecting portion and a second welded portion located rearward of the first welded portion and to be welded to the second connecting portion.

Effect of the Invention

According to the present disclosure, it is possible to provide a connection structure for connecting a flat cable and a terminal fitting, the connection structure being capable of suppressing a reduction in connection reliability.

DETAILED DESCRIPTION TO EXECUTE THE INVENTION

Description of Embodiments of Present Disclosure

Figure 1:
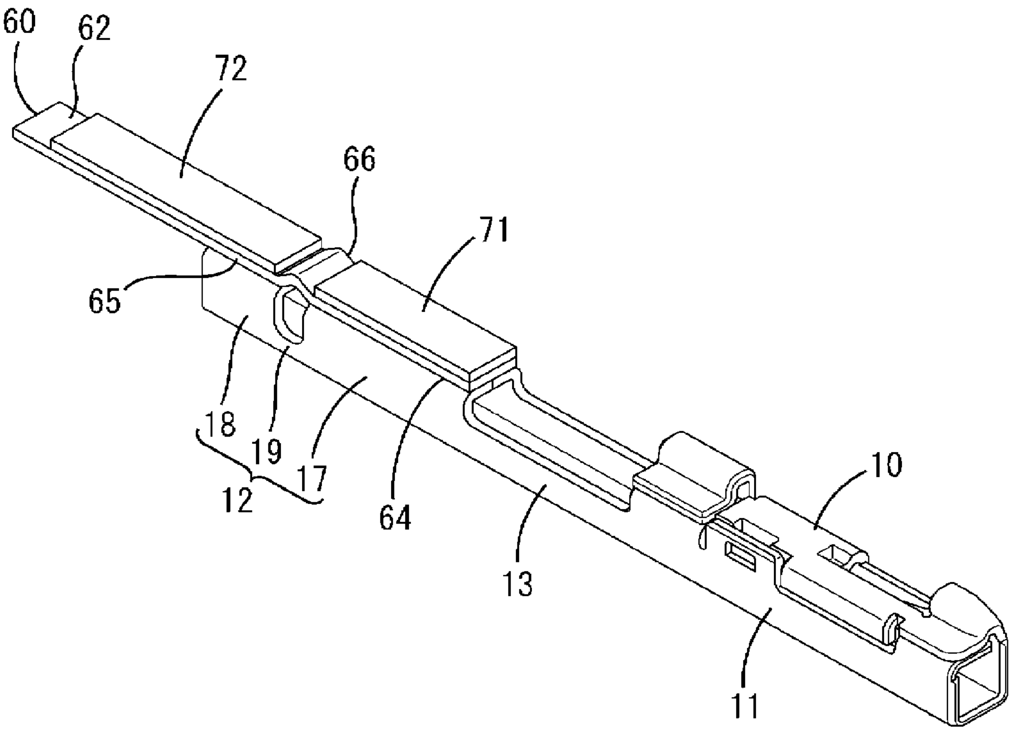
FIG. 1 is a perspective view showing a connection structure for connecting a flat cable and a terminal fitting in an embodiment of the present disclosure.

First, embodiments of the present disclosure are listed and described.

(1) The connection structure for connecting a flat cable and a terminal fitting is provided with a flat cable and a terminal fitting to be connected to the flat cable, the flat cable including a first connecting portion located in a front end part of the flat cable and a second connecting portion located rearward of the first connecting portion, and the terminal fitting including a first welded portion to be welded to the first connecting portion and a second welded portion located rearward of the first welded portion and to be welded to the second connecting portion.

According to the above configuration, when the flat cable is pulled rearward, stress generated in a connected part of the first connecting portion and the first welded portion can be alleviated by generating stress in a connected part of the second connecting portion and the second welded portion. Thus, even if an external force acts on the flat cable, the connection of the first connecting portion and the first welded portion can be satisfactorily maintained and a reduction in connection reliability can be suppressed.

(2) Preferably, the flat cable includes a bent portion between the first and second connecting portions, and the terminal fitting includes a resiliently deformable linking portion between the first and second welded portions.

According to the above configuration, when the flat cable is pulled rearward, the linking portion is resiliently deformed while the bent portion is deformed to extend. Thus, the stress generated in the connected part of the first connecting portion and the first welded portion can be more satisfactorily alleviated.

(3) The linking portion may be respectively linked to the first and second welded portions via a first boundary portion and a second boundary portion, and the first and second boundary portions may be both formed into a curve.

According to the above configuration, since the stress can be dispersed to each of the curved first and second boundary portions, stress generated in a connected part of the first and second connecting portions can be more satisfactorily alleviated.

(4) The flat cable may include a second reinforcing plate to be overlapped on the other surface of the second connecting portion when the second welded portion is welded to one surface of the second connecting portion.

According to the above configuration, since the second connecting portion is reinforced by the second reinforcing plate, the connection of the second connecting portion and the second welded portion can be strengthened. When an external force acts on the flat cable, the flat cable can be prevented from being broken in a part corresponding to the second connecting portion.

(5) The flat cable may include a first reinforcing plate to be overlapped on the other surface of the first connecting portion when the first welded portion is welded to one surface of the first connecting portion.

According to the above configuration, since the first connecting portion is reinforced by the first reinforcing plate, the connection of the first connecting portion and the first welded portion can be strengthened. By reinforcing the first connecting portion by the first reinforcing plate, the electrical connection reliability of the first connecting portion and the first welded portion can be further improved.

DETAILS OF EMBODIMENT OF PRESENT DISCLOSURE

A specific example of an embodiment of the present disclosure is described below with reference to the drawings. Note that the present invention is not limited to these illustrations, but is represented by claims and intended to include all changes in the scope of claims and in the meaning and scope of equivalents.

Figure 2:
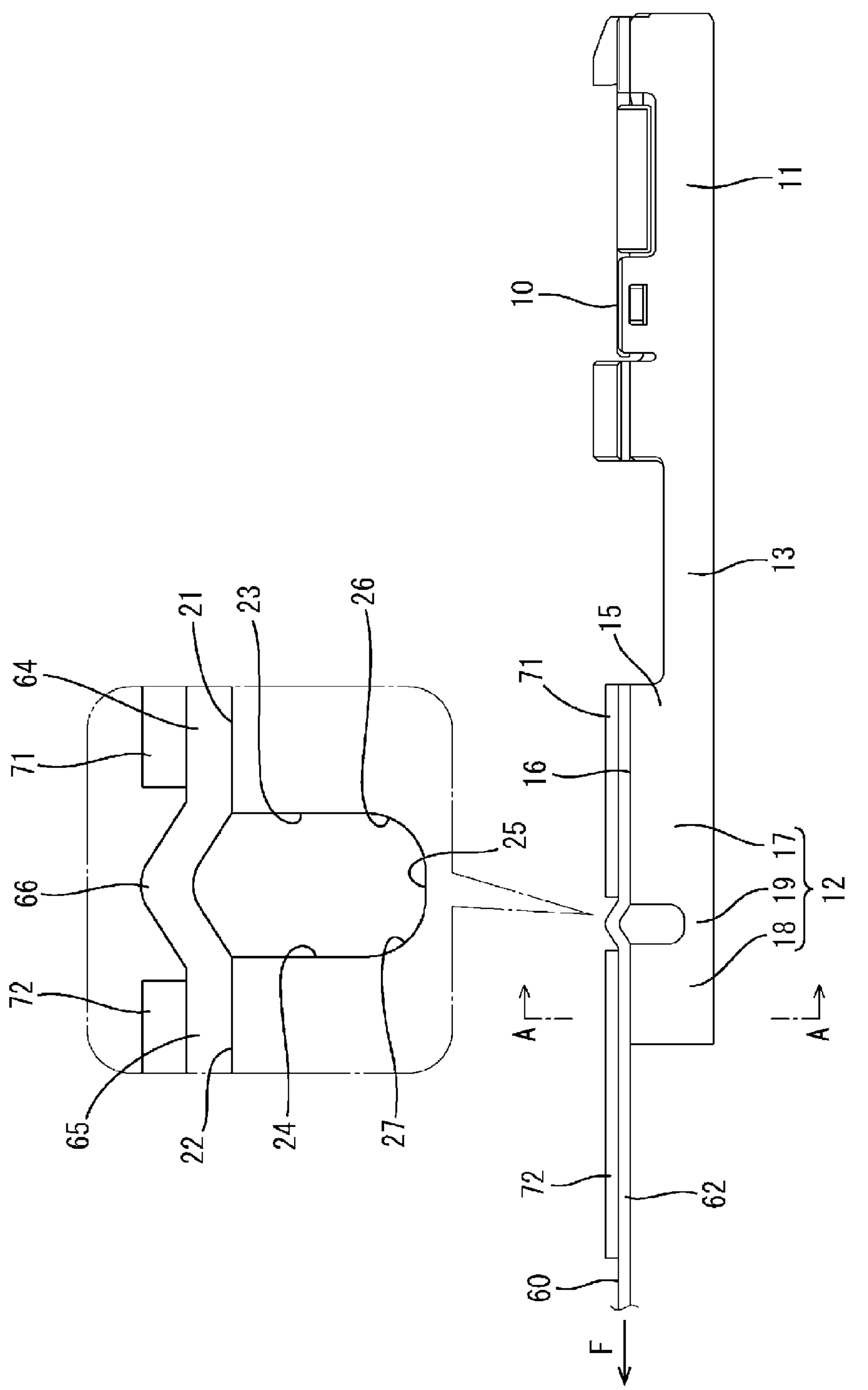
FIG. 2 is a side view showing the connection structure for connecting the flat cable and the terminal fitting.

This embodiment is provided with a flat cable 60 and terminal fittings 10. The terminal fitting 10 is electrically and mechanically connected to the flat cable 60. Note that, in the following description, an end side of the flat cable 60 to be connected to the terminal fittings 10 is referred to as a front side and an opposite side thereof is referred to as a rear side concerning a front-rear direction. A right side of FIG. 2 is the front side. A width direction is synonymous with a lateral direction and corresponds to the lateral direction of FIGS. 3 and 4.

<Flat Cable>

The flat cable 60 is a flat conductor and, in the case of this embodiment, constituted by a flexible printed circuit (FPC) board. Although not shown, the flat cable 60 includes a plurality of conductive paths formed on both surfaces or one surface of an insulation film and a protection film for covering the conductive paths.

Figure 4:
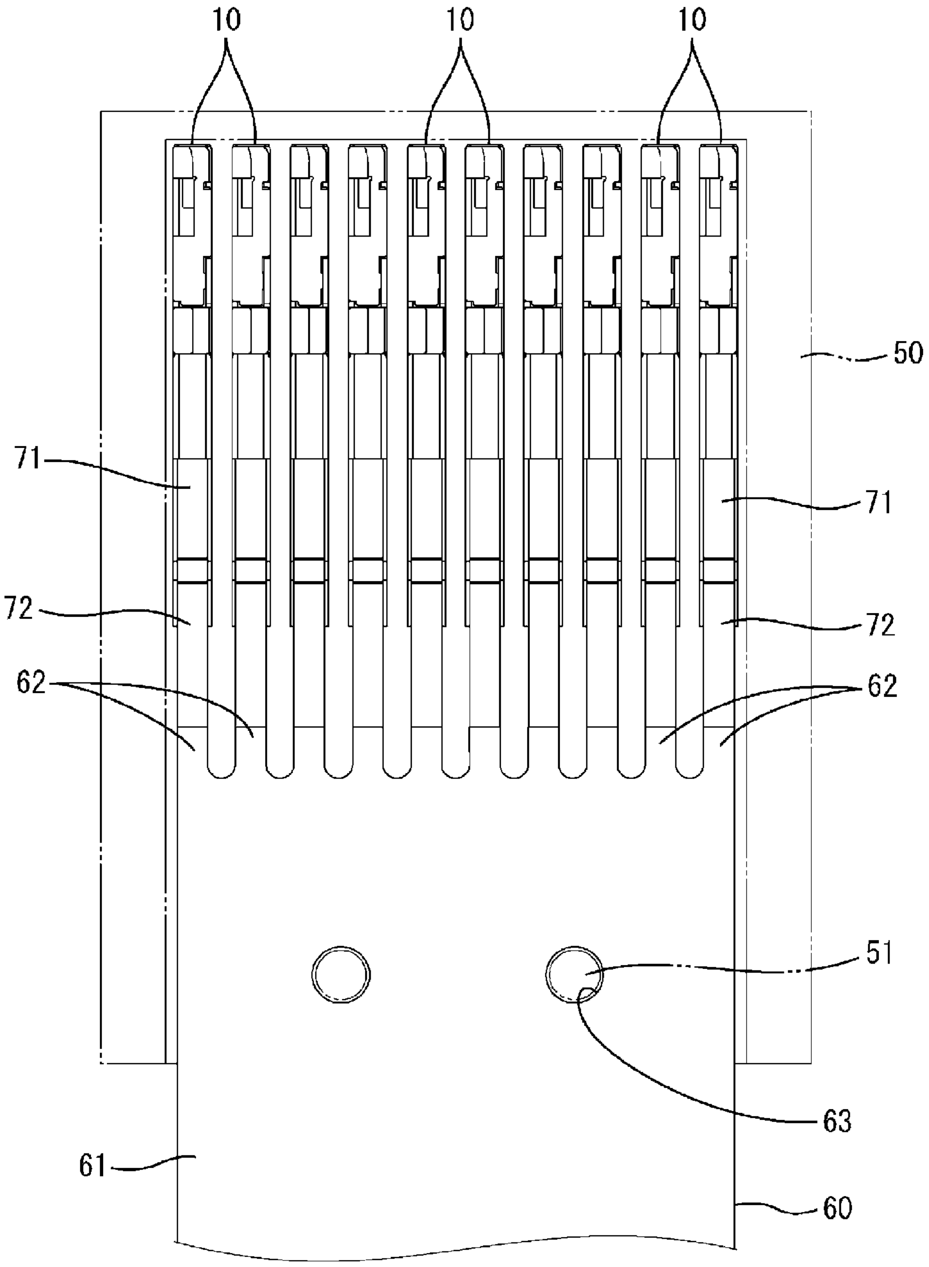
FIG. 4 is a plan view showing a state where the terminal fittings are respectively connected to a plurality of strip-like portions of the flat cable.

As shown in FIG. 4, the flat cable 60 includes a wide body 61 and a plurality of narrow connection strips 62 projecting forward like comb teeth from the front end of the body 61. The respective connection strips 62 have each the conductive path and are arranged in parallel to each other. The connection strip 62 is in the form of a strip extending in the front-rear direction and has constant width and thickness over an entire length.

A front part of the flat cable 60 is accommodated into a connector housing 50 together with the plurality of terminal fittings 10. Further, the flat cable 60 has a part pulled out rearward from the connector housing 50. This flat cable 60 is held in the connector housing 50 by fitting projections 51 formed in the connector housing 50 into holes 63 formed in the body 61.

<Terminal Fitting>

The terminal fitting 10 is formed by press-working an electrically conductive metal plate. This terminal fitting 10 is, as shown in FIG. 1, a female terminal and includes a box portion 11 in the form of a rectangular tube in a front part. A tab of a male terminal mounted in an unillustrated mating connector is inserted into the box portion 11 of the terminal fitting 10 from front and connected.

The terminal fitting 10 includes a base portion 12 in the form of a rectangular tube behind the box portion 10. A coupling portion 13 having a concave cross-section is provided between the box portion 11 and the base portion 12. The box portion 11 and the base portion 12 are coupled via the coupling portion 13.

Figure 3:
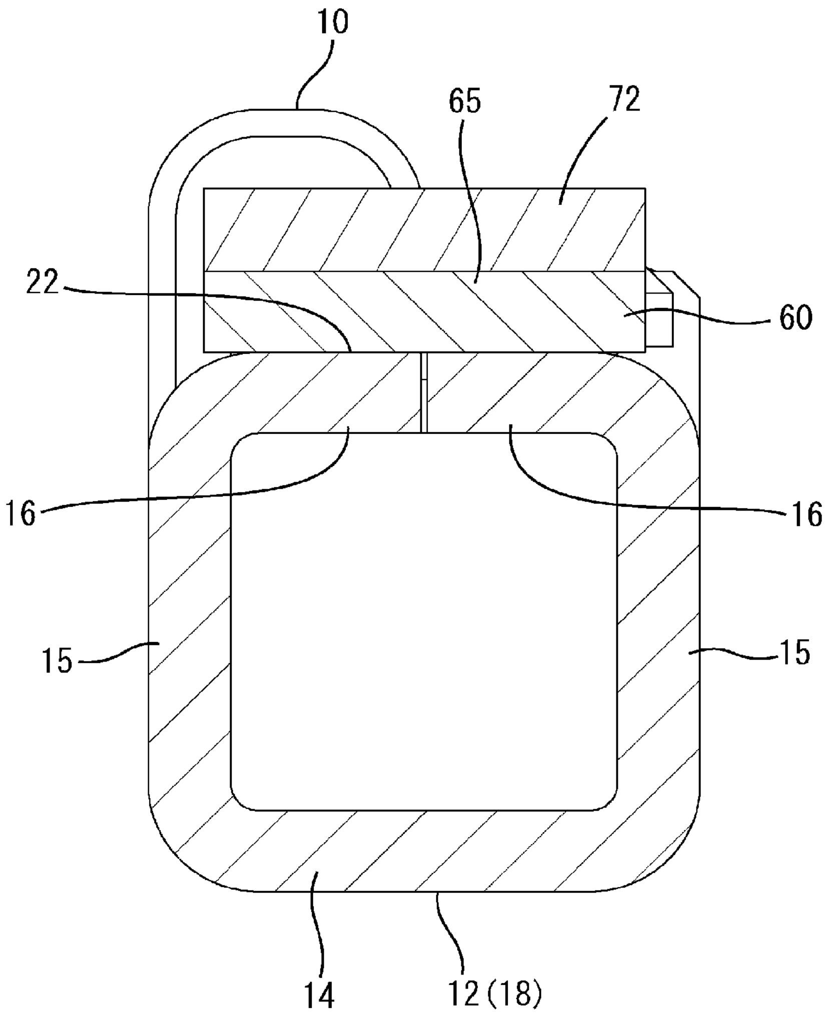
FIG. 3 is a section along A-A of FIG. 2.

As shown in FIG. 3, the base portion 12 includes a bottom plate 14, a pair of side plates 15 rising from both ends in the width direction of the bottom plate 14 and a pair of ceiling plates 16 projecting inward in the width direction from the upper ends of the pair of side plates 15. Inner end edges in the width direction of the both ceiling plates 16 are arranged to face each other while being butted against each other along the front-rear direction in a widthwise central part of the base portion 12.

Further, as shown in FIG. 1, the base portion 12 includes a first welded portion 17 located in a front part, a second welded portion 18 located in a rear part and a linking portion 19 located between the first and second welded portions 17, 18. The first and second welded portions 17, 18 have rigidity to maintain certain shapes. The linking portion 19 is resiliently deformable in a direction intersecting the front-rear direction.

Both of the first and second welded portions 17, 18 have a rectangular cross-sectional shape and include the bottom plate 14, the both side plates 15 and the both ceiling plates 16. The first welded portion 17 is formed to be longer in the front-rear direction than the second welded portion 18 and, in the case of this embodiment, has a length equal to or more than twice the length of the second welded portion 18. The front end of each of lower parts of the both side plates 15 and the bottom plate 14 in the first welded portion 17 is integrally connected to the coupling portion 13.

As shown in FIG. 2, each of the first and second welded portions 17, 18 has a first joint surface 21 and a second joint surface 22 flat in the front-rear direction and width direction on the upper surfaces of the both ceiling plates 16.

The rear end of each of the both side plates 15 and the both ceiling plates 16 in the first welded portion 17 constitutes a first end 23 along a vertical direction. The front end of each of the both side plates 15 and the both ceiling plates 16 in the second welded portion 18 constitutes a second end 24 along the vertical direction. The first and second ends 23, 24 are arranged at a certain interval and in parallel to each other.

The linking portion 19 includes the bottom plate 14, but does not include the both ceiling plates 16, thereby being open upward. Heights of the both side plates 15 of the linking portion 19 are equal to or less than half the heights of the both side plates 15 in the first and second welded portions 17, 18. The upper ends of the both side plates 15 of the linking portion 19 are continuously curved as a whole in a side view. Specifically, as shown in FIG. 2, the upper end of each of the both side plates 15 of the linking portion 19 includes a straight portion 25 linearly extending along the front-rear direction, a first boundary portion 26 extending along a curve, in particular along an arc, from the front end of the straight portion 25 to the first end 23 and a second boundary portion 27 extending along a curve, in particular along an arc, from the rear end of the straight portion 25 to the second end 24. The straight portion 25 is arranged in a central part in the front-rear direction of the linking portion 19. The first and second boundary portions 26, 27 are shaped to be line-symmetric with each other in a side view.

<Connection Structure>

As shown in FIG. 2, the connection strip 62 of the flat cable 60 includes a first connecting portion 64 facing and soldered to the first joint surface 21 and a second connecting portion 65 facing and soldered to the second joint surface 22. In the case of this embodiment, reflow soldering is performed. The first connecting portion 64 is arranged in a front end part of the connection strip 62. The second connecting portion 65 is arranged behind and away from the first connecting portion 64.

The connection strip 62 includes a bent portion 66 bent into an upward projecting chevron shape between the first and second connecting portions 64, 65. The bent portion 66 is arranged away from the linking portion 19 above the linking portion 19. The first connecting portion 64, the bent portion 66 and the second connecting portion 65 are successively and continuously formed from the front end of the connection strip 62 toward a rear side in a front end part of the flat cable 60.

A first reinforcing plate 71 having a higher rigidity than the first connecting portion 64 is disposed on an upper surface opposite to a surface to be soldered to the first joint surface 21, out of both surfaces of the first connecting portion 64 in the connection strip 62. Similarly, a second reinforcing plate 72 having a higher rigidity than the second connecting portion 65 is disposed on an upper surface opposite to a surface to be soldered to the second joint surface 22, out of both surfaces of the second connecting portion 65 in the connection strip 62.

The first and second reinforcing plates 71, 72 are both made of synthetic resin and in the form of strip plates extending in the front-rear direction, and attached to the upper surfaces of the respective first and second connecting portions 64, 65 via an adhesive material. The first connecting portion 64 is sandwiched and held between the first reinforcing plate 71 and the first welded portion 17. The second connecting portion 65 is sandwiched and held between the second reinforcing plate 72 and the second welded portion 18. The bent portion 66 is arranged between the rear end of the first reinforcing plate 71 and the front end of the second reinforcing plate 72.

The first reinforcing plate 71 has a length corresponding to the first connecting portion 64 in the front-rear direction and is arranged to be entirely overlapped on the entire first connecting portion 64. The second reinforcing plate 72 has a length exceeding the second connecting portion 65 in the front-rear direction and is so arranged that a front part is entirely overlapped on the entire second connecting portion 65 and a rear part projects rearward from the second connecting portion 65.

<Functions of Connection Structure>

After the first and second welded portions 17, 18 are soldered and welded to the connection strip 62 of the flat cable 60, the flat cable 60 may be pulled rearward and a rearward external force F (see FIG. 2) may act on the flat cable 60. If such an external force F acts on the flat cable 60, stress is generated in a connected part of the second joint surface 22 of the second welded portion 18 and the second connecting portion 65, but the mechanical connection of the second welded portion 18 and the second connecting portion 65 is maintained. Since the second connecting portion 65 is reinforced by the second reinforcing plate 72, the stability of the connection of the second welded portion 18 and the second connecting portion 65 is also ensured.

Further, when the flat cable 60 is pulled rearward, the linking portion 19 is resiliently deformed while the bent portion 66 is deformed to extend, whereby the transmission of the external force F from the second welded portion 18 toward the first welded portion 17 can be suppressed. Particularly, since the first and second boundary portions 26, 27 of the linking portion 19 are both formed into a curve, stress generated in the linking portion 19 is efficiently dispersed to each of the first and second boundary portions 26, 27.

In the above way, the stress generated in the connected part of the first joint surface 21 of the first welded portion 17 and the first connecting portion 64 is alleviated. Further, since the first connecting portion 64 is reinforced by the first reinforcing plate 71, the first joint surface 21 of the first welded portion 17 and the first connecting portion 64 are satisfactorily maintained in a facing state. As a result, the electrical connection of the first welded portion 17 and the first connecting portion 64 is also satisfactorily maintained.

As described above, according to this embodiment, when the flat cable 60 is pulled rearward, stress generated in the connected part of the first connecting portion 64 and the first welded portion 17 can be alleviated. Thus, even if the external force Facts on the flat cable 60, the connection of the first connecting portion 64 and the first welded portion 17 can be satisfactorily maintained and a reduction in connection reliability can be suppressed.

In the above case, the linking portion 19 is resiliently deformed while the bent portion 66 is deformed to extend, whereby stress generated in the connected part of the first connecting portion 64 and the first welded portion 17 can be more satisfactorily alleviated.

Further, since the stress can be dispersed along the curved shapes of the respective first and second boundary portions 26, 27 in the linking portion 19, stress generated in the connected part of the first and second connecting portions 64, 65 can be more satisfactorily alleviated.

Furthermore, since the second connecting portion 65 is reinforced by the second reinforcing plate 72, the connection of the second connecting portion 65 and the second welded portion 18 can be strengthened. When the external force F acts on the flat cable 60, the flat cable 60 can be prevented from being broken in a part corresponding to the second connecting portion 65.

Moreover, since the first connecting portion 64 is reinforced by the first reinforcing plate 71, the connection of the first connecting portion 64 and the first welded portion 17 can be strengthened. As a result, the electrical connection reliability of the first connecting portion 64 and the first welded portion 17 can be further improved.

Other Embodiments of Present Disclosure

The embodiment disclosed this time should be considered illustrative in all aspects, rather than restrictive.

Although the terminal fitting is a female terminal in the case of the above embodiment, the terminal fitting may be a male terminal as another embodiment.

Although the bent portion is angularly bent in the case of the above embodiment, the bent portion may be bent to be arcuately curved as another embodiment.

Although the bent portion is bent upward away from the linking portion in the case of the above embodiment, the bent portion may be bent downward toward the linking portion as another embodiment.

Although the terminal fitting is connected to the flat cable by solder welding in the case of the above embodiment, the terminal fitting may be connected to the flat cable by ultrasonic welding or resistance welding as another embodiment.

Although the terminal fitting includes the resiliently deformable linking portion between the first and second welded portions in the case of the above embodiment, the terminal fitting may not include the resiliently deformable linking portion between the first and second welded portions as another embodiment if the terminal fitting is structured such that the second welded portion and the second connecting portion are mechanically stably connected.

LIST OF REFERENCE NUMERALS

10 . . . terminal fitting
11 . . . box portion

12 . . . base portion
13 . . . coupling portion
14 . . . bottom plate
15 . . . side plate
16 . . . ceiling plate
17 . . . first welded portion
18 . . . second welded portion
19 . . . linking portion
21 . . . first joint surface
22 . . . second joint surface
23 . . . first end
24 . . . second end
25 . . . straight portion
26 . . . first boundary portion
27 . . . second boundary portion
50 . . . connector housing
51 . . . projection
60 . . . flat cable
61 . . . body
62 . . . connection strip
63 . . . hole
64 . . . first connecting portion
65 . . . second connecting portion
66 . . . bent portion
71 . . . first reinforcing plate
72 . . . second reinforcing plate
F . . . external force

What is claimed is:

1. A connection structure for connecting a flat cable and a terminal fitting, comprising:

a flat cable; and a terminal fitting to be connected to the flat cable, the flat cable including a first connecting portion located in a front end part of the flat cable and a second connecting portion located rearward of the first connecting portion, and the terminal fitting including a first welded portion to be welded to the first connecting portion and a second welded portion located rearward of the first welded portion and to be welded to the second connecting portion, wherein the flat cable includes a bent portion between the first and second connecting portions, and the terminal fitting includes a resiliently deformable linking portion between the first and second welded portions.

2. The connection structure of claim 1, wherein the linking portion is respectively linked to the first and second welded portions via a first boundary portion and a second boundary portion, and the first and second boundary portions are both formed into a curve.

3. The connection structure of claim 1, wherein the flat cable includes a second reinforcing plate to be overlapped on the other surface of the second connecting portion when the second welded portion is welded to one surface of the second connecting portion.

4. The connection structure of claim 1, wherein the flat cable includes a first reinforcing plate to be overlapped on the other surface of the first connecting portion when the first welded portion is welded to one surface of the first connecting portion.

5. The connection structure of claim 1, wherein the flat cable includes a body and a plurality of connection strips projecting from a front end of the body, and each connection strip includes the first connecting portion and the second connecting portion.

* * * * *